March 23, 1943.    R. P. SKERRITT    2,314,802
GRAVITY FEED CONTROL DEVICE
Filed Dec. 7, 1940    2 Sheets-Sheet 1

Inventor
ROY P. SKERRITT.
By
Attorneys

March 23, 1943.          R. P. SKERRITT          2,314,802
GRAVITY FEED CONTROL DEVICE
Filed Dec. 7, 1940          2 Sheets-Sheet 2
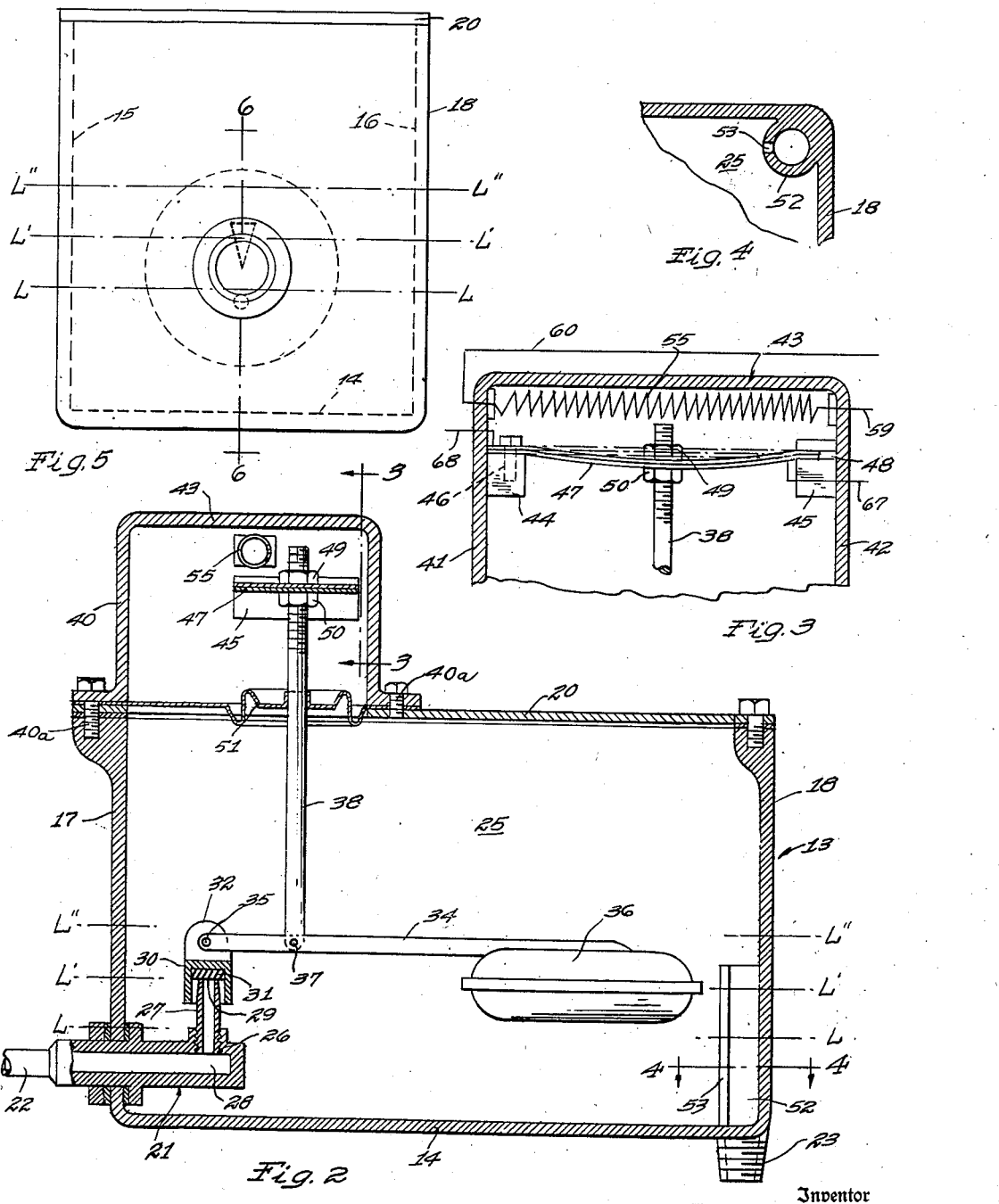
Inventor
ROY P. SKERRITT.
By
Attorneys Patented Mar. 23, 1943

2,314,802

UNITED STATES PATENT OFFICE 2,314,802

GRAVITY FEED CONTROL DEVICE

Roy P. Skerritt, Detroit, Mich.

Application December 7, 1940, Serial No. 369,026

5 Claims. (Cl. 236—91)

This invention relates generally to control systems for heating apparatus and more particularly to gravity feed control devices.

It is an object of the present invention to provide a new and improved liquid level control device in which the liquid level may be raised or lowered to change correspondingly the rate of flow of liquid from a liquid level chamber of the device.

Another object of the invention is to provide for a heating system, a control system for controlling the rate of supply of liquid fuel to a burner in accordance with the temperature of a room or other enclosed spaces to be heated, or in accordance with outdoor temperature, or both.

Another object of the invention is to provide a new and improved device for controlling supply of oil by gravity to an oil burner such that a low, medium or high fire may be obtained in accordance with temperature requirements.

Other objects of the invention will become apparent from the following detailed description taken in connection with the accompanying drawings in which Figure 1 is a diagrammatical view of an automatically controlled heating system embodying features of my invention;

Figure 2 is a view in vertical longitudinal section of a gravity feed control device embodying features of my invention;

Fig. 3 is a fragmentary view in vertical cross section of the gravity feed control device, taken along the line 3—3 of Fig. 2;

Fig. 4 is a fragmentary view in cross section of the control device casing, taken along the line 4—4 of Fig. 2;

Fig. 5 is an end view showing a modified form of outlet for the gravity feed control device.

Figure 1:
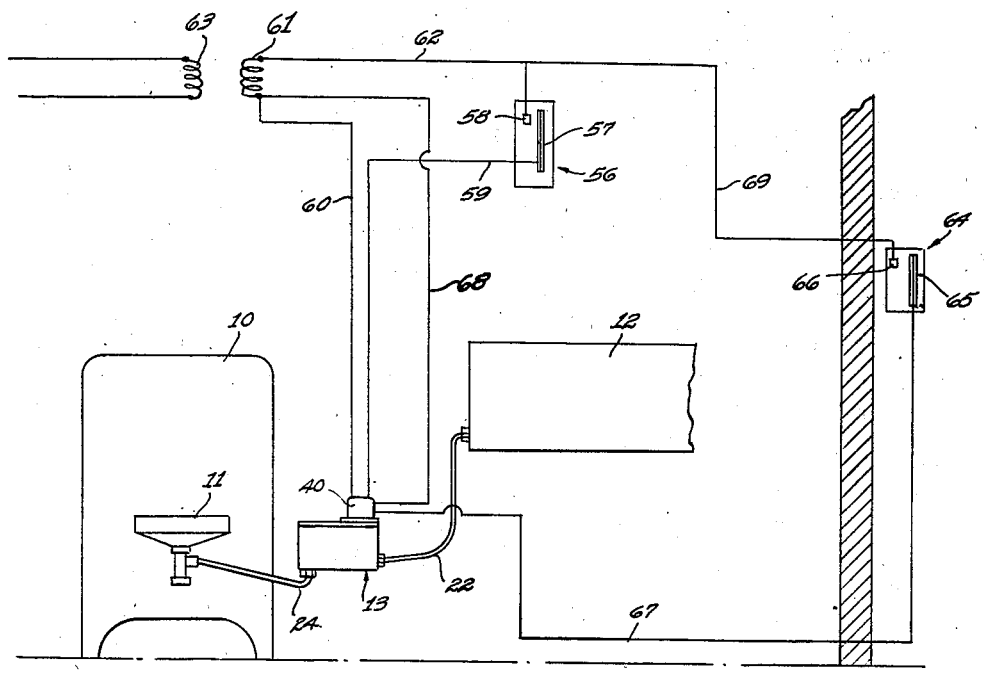

Referring to the drawings by characters of reference and first to Fig. 1, there is shown a furnace 10 having an oil burner 11 to which oil is supplied by gravity from a storage tank or reservoir 12. In order to insure a constant pressure head to obtain a substantially constant rate of flow of oil to the burner 11, a gravity feed or liquid fuel level control device 13 is provided intermediate the reservoir 12 and the burner 11.

The control device 13 includes a casing having a bottom wall 14, side walls 15 and 16, end walls 17 and 18, and a removable top wall or cover 20. A horizontally extending inlet fitting 21 projects into the device 13 through the casing end wall 17, and the outer end of the fitting 21 is connected by means of a conduit 22 to the reservoir or tank 12. In the casing bottom wall 14, adjacent the end wall 18 thereof, an external outlet fitting 23 is connected by a conduit 24 to the oil burner 11 by connections which may be of any suitable type. The casing provides a liquid level chamber 25 into which the inlet fitting 21 extends, the latter being provided with a threaded bore 26 to receive the lower end of an outlet fitting 27 which communicates with a longitudinally extending passage or bore 28 provided in said inlet fitting. The outlet fitting 27 may be in the form of an open ended upstanding tubular member, the upper end of which provides an outlet and seat 29 for a vertically movable valve member 30. In the present instance, the valve member 30 is provided with a hollow lower end portion which freely or loosely fits over the upper end of the fitting 27, and secured in the hollow valve member 30 there is a valve face member 31 for seating on the upper end of the fitting 27, the valve face member 31 preferably being made of rubber or other suitably resilient material. The upper end of the valve member 30 is preferably bifurcated, as at 32, to receive one end of an operating lever 34 which is pivoted to the valve member 30 by a transverse pin 35. Rigidly secured to the other end of the lever 34, within the chamber 25, there is a float member 36 which is operable in response to changes in liquid level in the chamber 25 to actuate the valve member 30 and maintain selective, predetermined, substantially constant liquid levels in the chamber 25. The lever 34 is provided with a vertically movable fulcrum and, in the present instance, is pivoted intermediate its ends, as at 37, to the lower end of a vertically movable rod or supporting member 38. The rod 38 extends upwardly into a casing 40 which may be rigidly secured to the top of the casing cover 20 by screws 40a or by other suitable means.

The upper casing 40 includes side walls 41 and 42 and a top wall 43, and adjacent the top wall 43 the side walls 41 and 42 are provided respectively with inwardly extending integral bosses 44 and 45. Secured to the boss 44, such as by means of a screw 46, is one end of a thermostatic actuator or bi-metallic element 47, the other end of which is movably retained in a slot 48 provided in the other and oppositely disposed boss 45 to permit flexing movement of the element 47. Intermediate its ends, the bi-metallic element 47 is provided with an aperture through which the rod 38 extends, the upper end of the rod being threaded to receive a pair of nuts 49 and 50 which engage opposite sides of the blade 47. The blade 47, in response to temperature changes, operates through the rod 38 to raise or lower the fulcrum of the lever 34 whereby to change the liquid level maintained in the chamber 25 by the float actuated valve 30. In order to prevent fuel or fumes from the chamber 25 coming in contact with the thermostatic element 47, a diaphragm 51 is provided to seal the upper casing 40 from the fuel chamber 25. As shown in Fig. 2, the diaphragm is clamped at an outer border portion thereof between the upper and lower casings, the diaphragm being secured and sealed to the vertically movable rod 38.

In Fig. 2 of the drawings, various liquid levels, which may be maintained by the present control, are illustrated. For example, the line L—L represents a low liquid level, the line L'—L' represents an intermediate liquid level and the line L''—L'' represents a high liquid level. Or, in other words, since in gravity feed oil burners the flame depends upon the rate of supply of oil to the burner, the level L—L corresponds to a low burner flame, L'—L' to an intermediate burner flame for use during the greater part of the heating season, and L''—L'' to a high flame for use during severely cold weather. These levels may be selected, as desired, as previously mentioned, by loosening the nuts 49 and 50 and adjusting the rod 38 relative to the thermostatic blade 47.

Within the chamber 25 there is an outlet tube 52 which extends upwardly from the outlet 23 and may be formed integral with the casing, the upper end of the tube 52 being open and within the liquid level chamber 25. In the side wall of the tube 52 a vertically extending slot-like aperture 53 is provided for flow of oil from the chamber 25 into the outlet tube 52 at a rate of flow depending upon the height of the liquid or pressure head maintained in the chamber 25. Disposed within the casing 40, in heat transfer relation with the thermostatic element 47, is an electric coil resistance or heater 55 for affecting operation of the element 47. A room thermostat, designated in general by the numeral 56, controls the heater element 55 and is diagrammatically illustrated as comprising a bi-metallic blade 57 and a thermostat contact 58. The blade 57 is connected by a lead wire 59 to one end of the heating coil 55, and the other end of the heating coil 55 is connected by a lead wire 60 to one terminal of a transformer secondary coil 61, the other terminal of the coil 61 being connected by a lead wire 62 to the thermostat contact 58. The primary coil, as at 63, may have its terminals connected by suitable lead wires to the usual 110 v. line. The room thermostat 56, upon calling for heat, energizes the coil 55 which then heats the thermostatic element 47 causing the element to flex upwardly from the position shown in full lines in Fig. 3 to raise the fulcrum 37 of the float lever 34. This raises the liquid level to the intermediate level L'—L' and correspondingly increases the rate of fuel flow to the burner 11 thus increasing the burner flame. This change of level from a low level to a high level is also made possible, in the present system, by the provision of an outdoor thermostat 64 comprising a bi-metallic element 65 and a thermostat contact 66. In this connection, thermostatic blade 47 also serves as the resistance heater, the outdoor thermostat blade 65 being connected by a lead wire 67 to one end of the blade 47, and the other end of the blade 47 being connected by a lead wire 68 to a terminal of the transformer secondary coil 61. A lead wire 69 connects the outdoor thermostat contact 66 to the lead wire 62 thus providing for a closed circuit when the outdoor thermostat blade engages its cooperable contact 66.

*Operation*

In operation, assuming that the weather is mild as it may be in the spring or fall, the outdoor thermostat 64 and the indoor thermostat 56 are both in open circuit position or not calling for heat with the result that the oil level maintained in the chamber 25 will be at the lowest level designated L—L with accompanying low burner flame. As previously mentioned, the level L—L corresponds to a low burner flame which may be selected such that it will not be too low to cause a deposit of carbon or the products of combustion in the burner and may be sufficiently high to maintain some room air circulation to prevent stratification of the room air. If the outdoor temperature decreases such that additional heat is required to maintain a comfortable temperature, for example 70° F. to 72° F., in a room or rooms to be heated or for whatever temperature the room thermostat 56 might be set for, the thermostat 56 will close its circuit and energize the heating coil 55. The thermostatic element 47 will now respond to the heat of the coil 55 and will move upwardly raising the fulcrum 37 of the lever 34, after which the float 36 will operate to maintain the intermediate level L'—L'. Assuming that the level is at the low level L—L, if there is a sudden decrease in outdoor temperature, the outdoor thermostat 64 will act to close the circuit of the thermostatic actuator 47 which will heat the actuator 47 causing it to flex upwardly to raise the liquid level to the intermediate level L'—L'. Thus, it will be seen that either the room thermostat 56 or the outdoor thermostat 64 may act separately to increase the burner flame to intermediate flame. In severe or very cold weather, the outdoor thermostat may remain in closed position to prevent decrease in the burner flame to the lowest flame and, when the room thermostat calls for heat, it will be seen that the thermostatic actuator or blade 47 will be further heated by the resistance coil 55. When this condition exists, that is when both thermostats are calling for heat, the lever fulcrum 37 is raised to the high position after which the float 36 acts to maintain the higher fuel level L''—L'' and correspondingly higher burner flame. Thus, it will be seen that the present gravity feed device and controls therefor will function to provide in a gravity feed burner a low fire for mild weather, an intermediate fire for cold weather and a high fire for severely cold weather.

Figure 6:
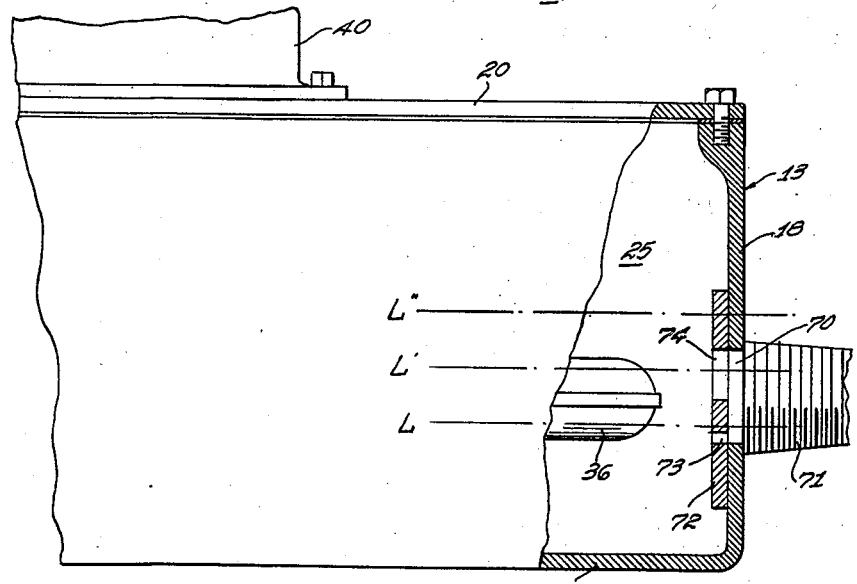
Fig. 6 is a view partly broken away and in section of the device, taken along the line 6—6 of Fig. 5.

Referring now to the modification shown in Figs. 5 and 6 of the drawings, this device differs from the previously described device only in the outlet structure. In the end wall 18 of the casing, an opening 70 is provided which opens outwardly through a fitting 71 which may be formed integral with the casing wall 18, the outlet fitting being provided for connection by a suitable conduit to a gravity fed oil burner. Overlying the opening 70 and secured to the casing end wall there is a plate 72 provided with a pair of vertically spaced apertures or ports 73 and 74. The lower port 73 may be in the form of a bore and is provided to restrict fuel flow to the burner to provide a low or pilot size flame, this condition existing only when the liquid level is maintained at the level L—L. The upper port, or port 74, is preferably a V-shaped aperture, the sides of which converge downwardly to an apex. The intermediate level may be selected such that any part of the flow capacity of the V-shaped port may be utilized and the high level or level L''—L'' may be selected as illustrated such that the entire flow capacity of the V-shaped port is utilized.

While I have shown and described my invention in some detail, it is to be understood that the same is to be limited only by the appended claims for many changes may be made without departing from the spirit and scope of my invention.

What I claim is:

1. In a heating system, heating means for supplying heat to a selected space, fuel supply means for supplying fuel to said heating means, valve means operatively disposed between said fuel supply means and said heating means for controlling the supply of fuel from the one to the other, actuating means for actuating said valve means, a thermostat disposed in an electrical circuit therefor and operable responsive to temperature variations within said space for controlling said circuit, a second thermostat disposed in a second electrical circuit therefor and operable responsive to temperature variations without said space for controlling said second circuit, means in series with one of said thermostats and operable responsive to the closing of the respective circuit therefor for converting the resulting electrical energy into heat energy, and means operatively connected to said valve actuating means and in heat exchange relationship with said energy converting means for responding to the creation of said heat energy to actuate said valve means a predetermined extent and also being disposed in series with the other of said thermostats and operable responsive to the closing of the respective circuit therefor for converting the resulting electrical energy into mechanical energy to actuate said valve means another predetermined extent.

2. In a heating system, heating means for supplying heat to a selected space, fuel supply means for supplying fuel to said heating means, valve means operatively disposed between said fuel supply means and said heating means for controlling the supply of fuel from the one to the other, actuating means for actuating said valve means, a thermostat disposed in an electrical circuit therefor and operable responsive to temperature variations within said space for controlling said circuit, a second thermostat disposed in a second electrical circuit therefor and operable responsive to temperature variations without said space for controlling said second circuit, means in series with said first-named thermostat and operable responsive to the closing of said first-named circuit for converting the resulting electrical energy into heat energy, and means operatively connected to said valve actuating means and in heat exchange relationship with said energy converting means for responding to the creation of said heat energy to actuate said valve means a predetermined extent and also being disposed in series with said second-named thermostat and operable responsive to the closing of said second circuit for converting the resulting electrical energy into mechanical energy to actuate said valve means another predetermined extent.

3. In a heating system, heating means for supplying heat to a selected space, fuel supply means for supplying fuel to said heating means, valve means operatively disposed between said fuel supply means and said heating means for controlling the supply of fuel from the one to the other, actuating means for actuating said valve means, a thermostat disposed in an electrical circuit therefor and operable responsive to temperature variations within said space for controlling said circuit, a second thermostat disposed in a second electrical circuit therefor in parallel with said first-named circuit and operable responsive to temperature variations without said space for controlling said second circuit, means in series with said first-named thermostat and operable responsive to the closing of said first-named circuit for converting the resulting electrical energy into heat energy, and means operatively connected to said valve actuating means and in heat exchange relationship with said energy converting means for responding to the creation of said heat energy to actuate said valve means a predetermined extent and also being disposed in series with said second-named thermostat and operable responsive to the closing of said second circuit for converting the resulting electrical energy into mechanical energy to actuate said valve means another predetermined extent.

4. A liquid level controlling device comprising a casing having a chamber for liquid, an inlet and an outlet for said chamber, a valve member controlling said inlet, a float member for actuating said valve member to maintain a substantially constant liquid level in the chamber, a lever operatively connecting said float member and said valve member, a vertically movable fulcrum member for said lever, said fulcrum being movable to change the liquid level maintained by said float member, thermostatic means supported by said casing, an energizable electric circuit for said thermostatic means, said thermostatic means being operatively connected to said fulcrum member for moving the latter responsive to energization of said circuit, heating means positioned adjacent said thermostatic means, and an electric circuit for said heating means whereby energization of the heating means will effect the operation of the thermostat to move the fulcrum member.

5. A liquid level control device comprising a casing having a chamber for liquid, an inlet and an outlet for said chamber, a valve member controlling said inlet, a float member responsive to changes in liquid level in said chamber for actuating said valve member to maintain a substantially constant liquid level therein, a lever operatively connected to said float member and valve member, a movable adjustable fulcrum member for said lever, said fulcrum member being raised or lowered to correspondingly change the liquid level maintained by said float chamber, a thermostatic member supported by the casing, an energizable electric circuit for said thermostatic member, a heating element adjacent said thermostatic element, an energizable circuit for said heating element, a connection between the fulcrum member and the thermostatic member whereby energization of one of said circuits will cause the fulcrum of the lever to be varied accordingly.

ROY P. SKERRITT.